March 19, 1963 A. FREUNDLICH 3,081,656
APPARATUS FOR MANUFACTURING TUBULAR BINDERS FOR LOOSELEAF BOOKS
Filed July 11, 1957 5 Sheets-Sheet 2
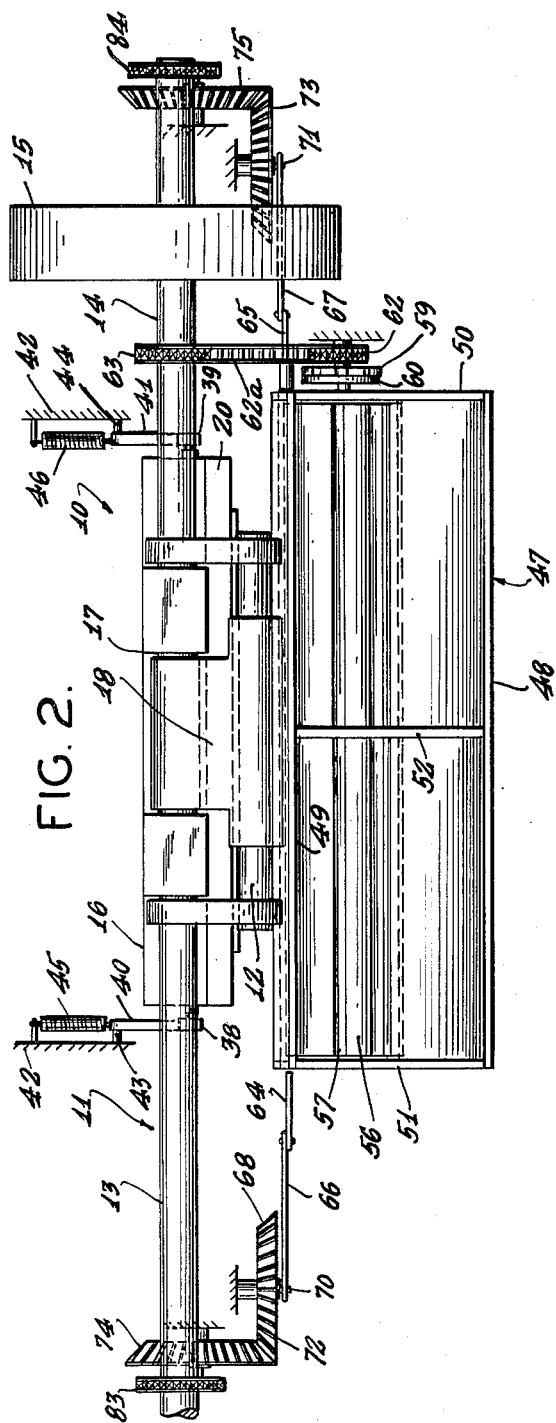
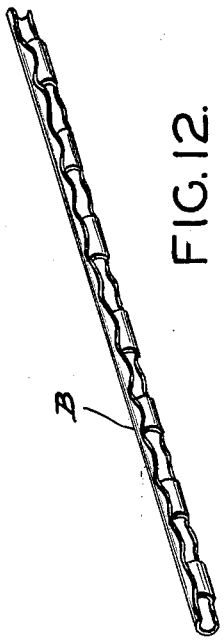
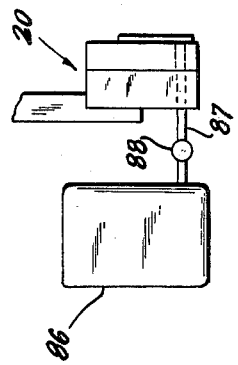
INVENTOR.
ALBERT FREUNDLICH
BY
J.B. Felshin
ATTORNEY.

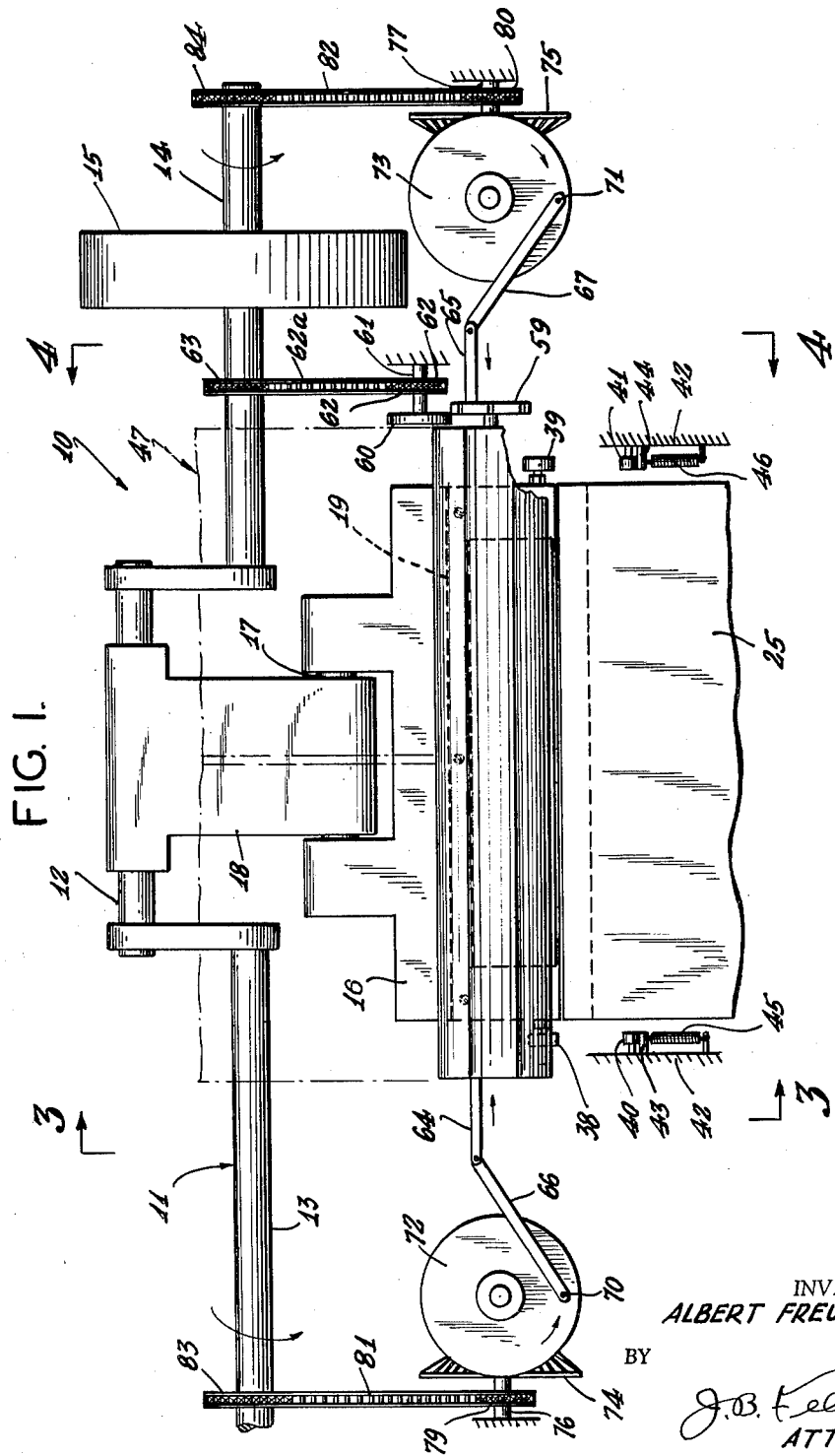

March 19, 1963 A. FREUNDLICH 3,081,656
APPARATUS FOR MANUFACTURING TUBULAR BINDERS FOR LOOSELEAF BOOKS
Filed July 11, 1957 5 Sheets-Sheet 3

INVENTOR.
ALBERT FREUNDLICH
BY
J. B. Felshin
ATTORNEY.

March 19, 1963 A. FREUNDLICH 3,081,656
APPARATUS FOR MANUFACTURING TUBULAR BINDERS FOR LOOSELEAF BOOKS
Filed July 11, 1957 5 Sheets-Sheet 4
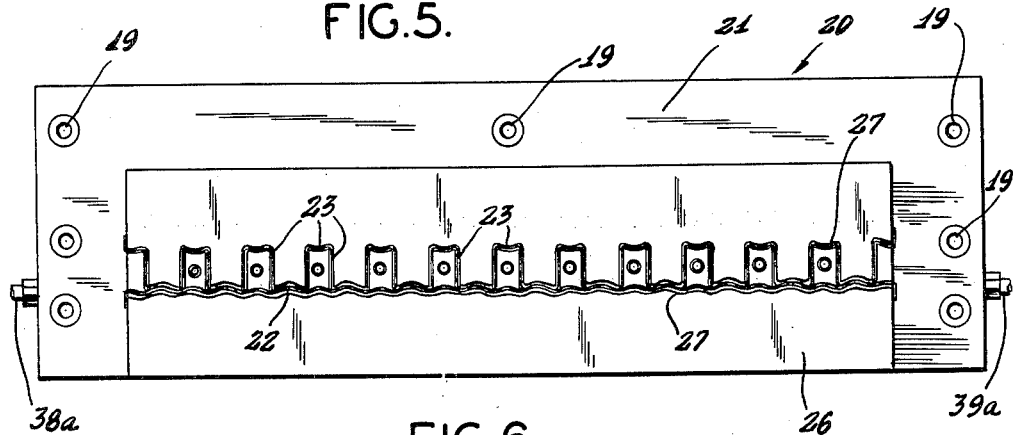
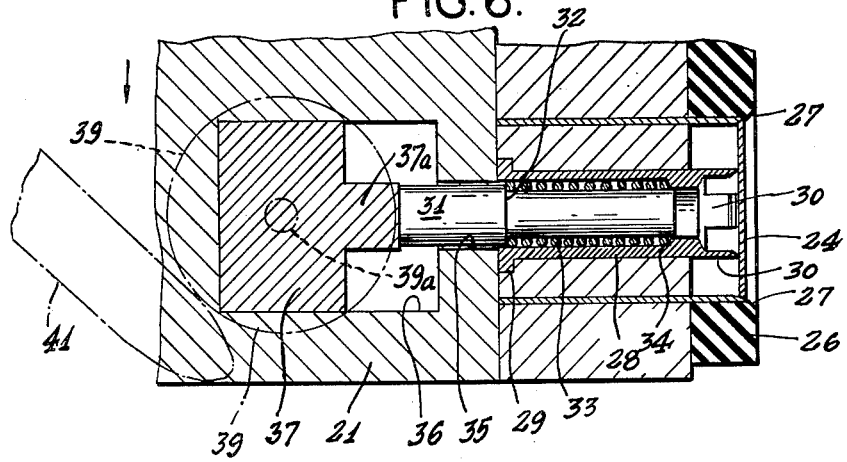
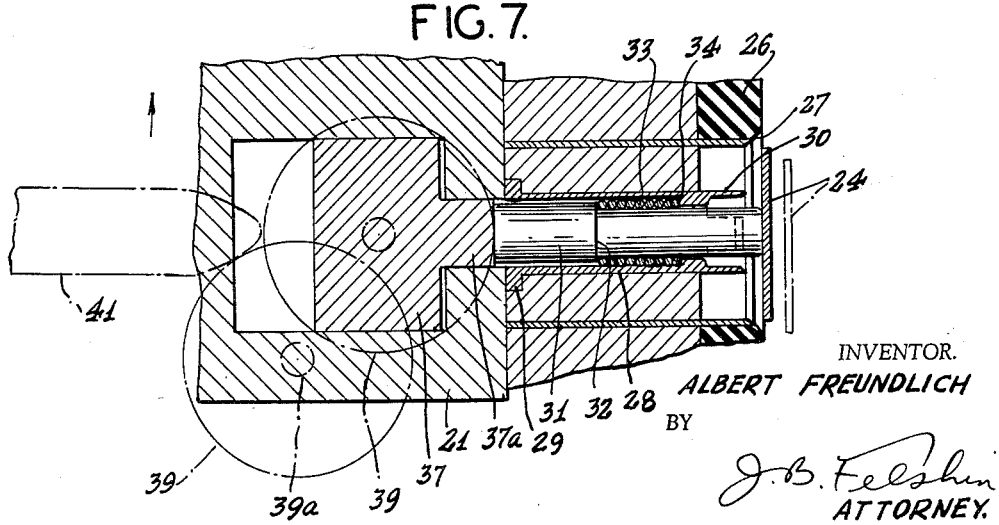
INVENTOR.
ALBERT FREUNDLICH
BY
J. B. Felshin
ATTORNEY.

INVENTOR.
ALBERT FREUNDLICH
BY
*J. B. Felshin*
ATTORNEY.

United States Patent Office 3,081,656
Patented Mar. 19, 1963

3,081,656
APPARATUS FOR MANUFACTURING TUBULAR
BINDERS FOR LOOSELEAF BOOKS
Albert Freundlich, New York, N.Y., assignor to Freundlich-Gomez Machinery Corp., College Point, Long Island, N.Y., a corporation of New York
Filed July 11, 1957, Ser. No. 671,157
15 Claims. (Cl. 83—125)

This invention relates to apparatus for scoring and removing cut-out portions from the sides of tubular material and is directed particularly to a machine for automatically manufacturing tubular binders for looseleaf books.

The principal object of the invention is to provide a machine for converting lengths of tubing such as of a synthetic plastic material into tubular binders for looseleaf books.

Another object of the invention is to provide a machine of the character described which has mechanism for automatically positively removing the cut-out portions severed from the tubing lengths and converting the tubing lengths into tubular binders.

A more particular object of the invention is to provide a machine of the character described which is operative in sequential relation to insert a core rod into a length of plastic tubing, to roll the cored tubing length against a rule die for scoring the tubing along its length, and finally to remove all cut-out portions or blanks defined by the scoring operation.

Still another object of the invention is to provide in a machine of the above nature a rule die for cutting portions to be removed from a length of tubing including mechanism for separating the portions to be removed by first retaining them in the rule die when the length of tubing is removed and then separately ejecting the cut-out portions thus separated from the length of tubing.

Other objects, features and advantages of the invention will in part be obvious and in part be hereinafter pointed out.

The invention accordingly consists in the features of construction and combination of elements and arrangement of parts which will be exemplified in the construction hereinafter described and of which the scope of the invention will be indicated in the following claims.

Figure 3:
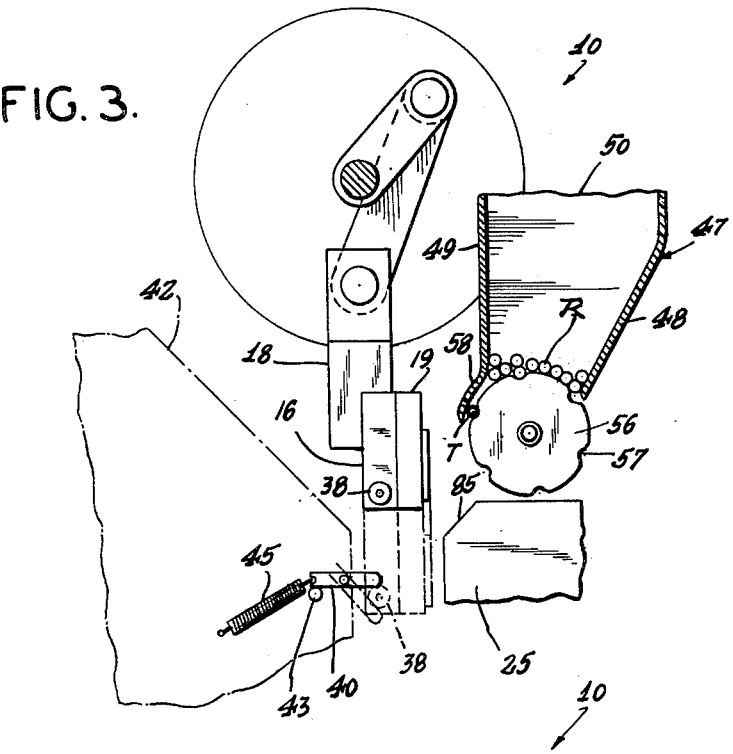
Figure 4:
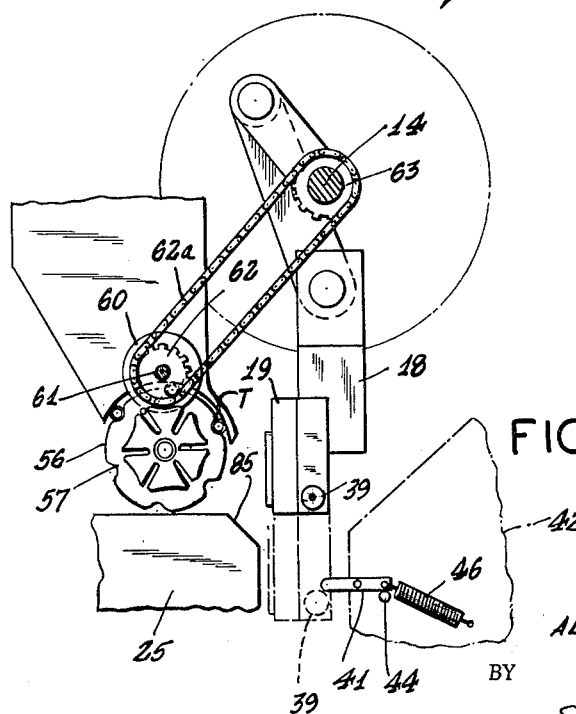
Figure 8:
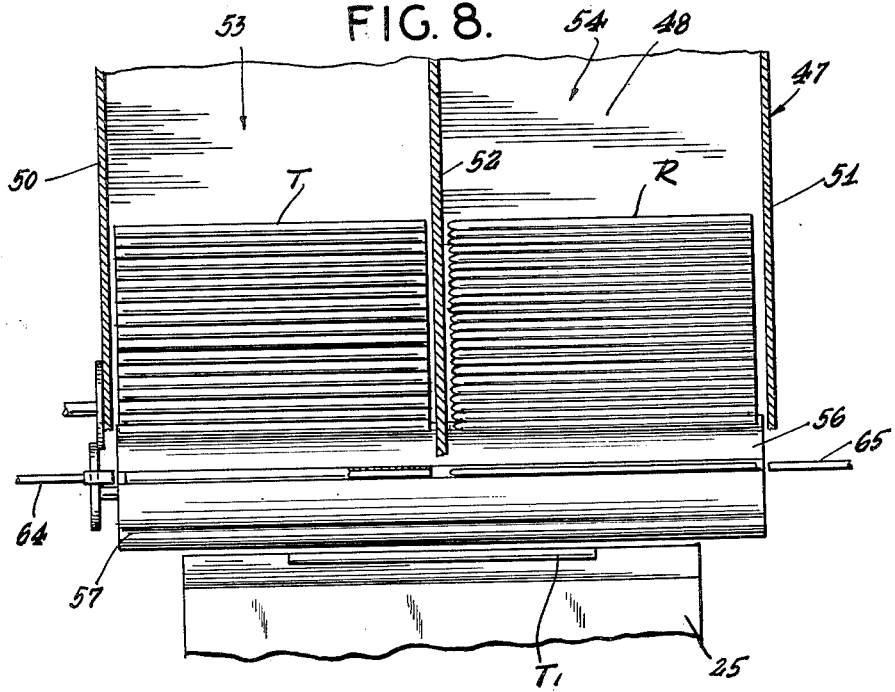
Figure 9:
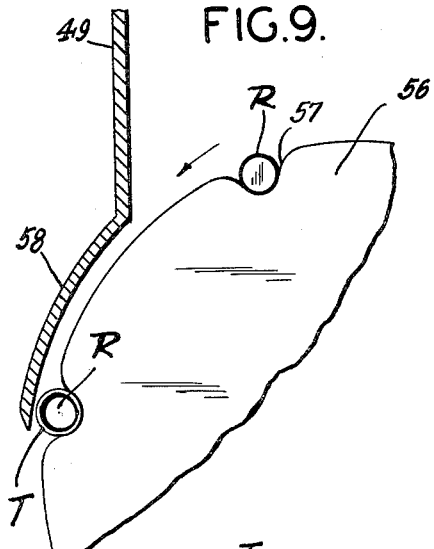
Figure 10:
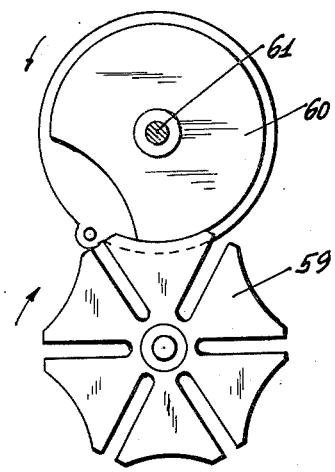
Figure 11:
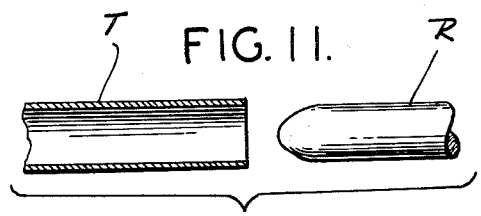

In the accompanying drawings, illustrating one form in which the invention may conveniently be embodied in practice;

FIG. 1 is a top front view, with portions broken away, of a machine embodying the invention, FIG. 2 is a top view of the machine shown in FIG. 1, FIG. 3 is a side elevational view, taken along the line 3—3 of FIG. 1, in the direction of the arrows, FIG. 4 is a side elevational view, taken along the line 4—4 of FIG. 1, in the direction of the arrows, FIG. 5 is a front view of the rule die forming part of the machine, FIG. 6 is a vertical cross-sectional view, taken through the rule die of FIG. 5, illustrating one of the blank-ejecting devices in one position of operation, FIG. 7 is a view similar to that of FIG. 6, showing the blank-ejecting device in another position of operation, FIG. 8 is a vertical cross-sectional view of the supply hopper and tube feed mechanism, FIG. 9 is an elevational view, on an enlarged scale, of the periodic tube-release drum associated with the supply hopper, FIG. 10 is an end view of the Geneva gear mechanism controlling the tube-release drum, FIG. 11 is an enlarged view illustrating the alignment of a length of tubing with a core rod just before insertion of the rod prior to release by the release drum, FIG. 12 is an oblique view of a finished tubular binder cut from a length of plastic tubing by the machine embodying the invention, and FIG. 13 illustrates a modification of the invention wherein compressed air is used instead of a lever for actuating the blank-ejecting devices of the rule die.

Referring now in detail to the drawings, wherein like reference numerals denote corresponding parts throughout the several views, the numeral 10 designates generally a machine embodying the invention, the same comprising a horizontally-journalled crank shaft 11 having a central, off-set shaft portion 12, and axially aligned end shaft portions 13 and 14. The crank shaft portion 13 is continuously rotated by means (not shown) during operation of the machine, and the shaft portion 14 is fitted with a flywheel 15 for smoothening the work cycle of the machine. A rectangular support plate 16 is arranged below the crank shaft 11 and is provided with an upper horizontal connecting pin 17 which is linked to the crank shaft portion 12 of crank shaft 11 by means of a connecting member 18 whereby said support plate will be reciprocated vertically in guide means (not shown) while the crank shaft 11 rotates.

Secured against one side of the reciprocable support plate 16 as by screws 19 is a rule die member 20 (see FIG. 5) comprising a rectangular body portion 21, preferably of a hard plywood, provided with aligned grooves fitted with steel cutter strips 22 and 23 arranged in a repetitive pattern for cutting along the sides of the successive lengths of tubing during each reciprocation of the rule die, as is hereinbelow described. The cutter strips 22 and 23 extend for a short distance beyond the outer face of the body portion 21, and come to a sharp edge at their outer ends (see FIG. 6). The particular rule die 20 shown in FIG. 5 is operative, by virtue of the end-to-end length of the wavy cutter strip 22, to cut or score the length of tubing with a wavy line, while the U-shaped cutter strips 23, by virtue of their ends extending to the cutter strip 22, define generally rectangular continuous cutting edges resulting in removal of cut-outs or blanks as indicated at 24 in FIGS. 6 and 7, in the processed length of tubing, as will be more clearly apparent from the following description.

As illustrated in FIGS. 3 and 4, the rule die member 20 is reciprocated in slightly spaced face-to-face relation with a fixed solid backing member 25, against which the individual lengths of tubing T to be cut, fitted with a core rod R, are rolled as the rule die moves downwardly during the cutting operation. To provide resilient squeezing action between the rule die 20 and the length of tubing being cut, the rule die is faced with a layer of sponge rubber 26 surrounding the cutter strips 22 and 23 and extending slightly beyond their outer edges. Preferably the sponge rubber layer 26 is beveled along the edges bordering the cutter strips 22 and 23, as indicated at 27.

Means is provided for temporarily retaining the cut-outs or blanks 24 in the rule die 20 just subsequent to their being cut from the tubing, and then ejecting them separately at the lowermost stroke position of the rule die after the cut tubing has been separately discharged from the machine. To this end, the body portion 21 of the rule die 20 has centrally located within the zone surrounded by each of the cutter strips 23, a bore within which a cylindrical member 28 is secured. The cylindrical member 28 is formed with a seating flange 29 at its inner end and has a crown-like outer end having arcuate, sharpened, projecting fingers 30. The projecting fingers 30 extend somewhat short of the outward extent of the cutter strips 22 and 23 and are adapted to cut slightly into the surface of the underside of the cut-out or blank 24 as it is being severed from its length of tubing, whereby it serves to separate and retain said cut-out as indicated in FIG. 6, after the tube from which it has been cut has fallen away from the machine. In order that the cut-outs 24 thus retained might later be ejected from the rule die in preparation for the next cutting cycle, the cylindrical member 28 is fitted with a coaxial plunger 31 having an annular shoulder 32. A coil spring 33 surrounding the plunger 31 and constrained between the shoulder 32 and an interior annular shoulder 34 formed within the cylindrical member 28 normally holds the plunger 31 in retracted position. The increased diameter inner end of the plunger 32 extends through a bore 35 in the body portion 21 and into a rectangular opening 36 extending horizontally from end to end in said body portion.

Shiftably arranged within, and extending from end to end in the rectangular opening 36 in the body portion 21 is a push bar 37 having a plurality of cylindrical lugs 37a aligned one each with the plungers 31. As illustrated in FIGS. 6 and 7, the cross-sectional size of the rectangular opening 36 is greater than that of the push bar 37 so that said push bar can be moved from the position shown in FIG. 6, wherein the plungers are in forwardly projected positions within their respective cylindrical members 28, at which positions the front ends of said plungers will have stripped the cut-outs 24 from the fingers 30 of said cylindrical members so that they will fall out of and away from the rule die 20, as indicated by the broken line representation of the cut-out 24 in FIG. 7.

The mechanism for moving the push bar 37 from its normal rearmost position, as is illustrated in FIG. 6, to a forward cut-out ejecting position shown in FIG. 7 at the lower end of the die rule stroke, comprises a pair of roller wheels 38, 39 journalled one at each end of the outwardly-extending ends of 38a, 39a of the push bar 37. Cooperative therewith are a pair of levers 40, 41 (see FIGS. 3 and 4) medially pivoted at each end of a fixed supporting structure indicated at 42. The levers 40, 41 are resiliently constrained at their inner ends against stop pins 43, 44 by springs 45, 46 so that only downward movement of their outer ends is permitted, and are positioned to be struck by the respective roller wheels 38, 39 as the rule die 20 moves into its lowermost stroke position. As illustrated in FIG. 6, during downward movement of the rule die 20, the levers 40 and 41 will be moved downwardly and passed by the camming action of the roller wheels 38, 39 (see also FIGS. 3 and 4). On the upward stroke, however, the stop pins 43, 44 prevent upward movement of the levers 40, 41 so that the camming action of said levers against the roller wheels 38, 39 causes inward movement of the push bar 37 as is illustrated in FIG. 7. It will be noted that the inward movement of the push bar 37 occurring at the beginning of the upward stroke of the rule die 20 serves to eject the cut-outs 24 in the manner described above, after the pertaining tubing length has been cut by the rule die.

Means is provided for individually automatically feeding lengths of tubing to be cut by the rule die 20 in sequence with the periodic reciprocation of said rule die, said means comprising an open-topped hopper 47 arranged above the backing member 25 and having an inclined back wall 48, a front wall 49, and end walls 50 and 51 (see FIGS. 3 and 8). The hopper is also provided with a central vertical partition wall 52 dividing the hopper into substantially equal compartments indicated at 53 and 54 (FIG. 8), into compartment 53 of which cut lengths of tubing T to be operated upon by the rule die 20 are placed in bulk and into compartment 54 of which core rods R, of a diameter slightly less than the internal diameter of the tubing lengths T, and having rounded ends, are placed.

Means is provided for sequentially inserting one of the core rods R into one of the tubing lengths T just prior to its release into the cutting die mechanism, the same comprising a tube release drum 56 provided with six peripherally-spaced longitudinal arcuate grooves 57. The tube release drum 56 is rotatably journalled at the lower open end of the hopper 47. The lower end of the front wall 49 of the hopper 47 is provided with a curved lip portion 58 extending for a short distance about the periphery of the tube release drum 56 in slightly spaced relation therefrom (see FIG. 9). As the drum 56 is rotated, in a manner presently to be described, a tube T and a rod R are picked up in opposite ends of a groove 57 in said drum and carried to a position just short of the outer end of the lip portion 58 thereof (see FIG 9). The mechanism for stepwisely rotating the drum 56 comprises a Geneva gear mechanism comprising a six-position Geneva gear 59 (see FIGS. 4 and 10) coaxially secured at one end of the release drum 56, and a cooperative Geneva drive wheel 60 mounted on a rotatably journalled shaft 61. The shaft 61 is fitted with a chain drive gear 62 which is in mesh with a sprocket chain 62a linking with a sprocket drive gear 63 mounted on the crank shaft portion 14 of the main drive crank shaft 11. It will be apparent that as the crank shaft 11 rotates to cause reciprocation of the rule die 20, as described above, the release drum 57 will, in timed relation, be moved so that the longitudinal grooves 57 therein will intermittently be moved by the above-described Geneva gear mechanism to come successively into the rest position illustrated in FIG. 9. The gear ratios are chosen so that the drum 56 will be moved through one of its 60 degree increments of movement for each cycle of reciprocation of the rule die 20.

Mechanism is also provided for moving the tube T and the rod R inwardly into interfitting relation during the interval when they are stationary near the outer end of the lip portion 58 of the front wall 59 of the hopper 47, as illustrated in FIGS. 8 and 9, said mechanism comprising a pair of cooperative reciprocating push rods 64, 65 axially guided at each side of the release drum 56 and coaxially aligned with the tube T and rod R in the above-mentioned stationary position (see FIG. 11). Connecting rods 66, 67 link the outer ends of the push rods 64, 65 with the eccentric crank pins 70, 71 on a pair of rotatably journalled bevelled gears 72, 73. The bevelled gears 72, 73 are intermeshed respectively with bevelled gears 74, 75 secured to rotatably journalled shafts 76, 77. The shafts 76, 77 carry sprocket gears 79, 80 which are interlinked by sprocket chains 81, 82 with chain drive gears 83 and 84 respectively mounted on the shaft portions 13 and 14 of the main drive crank shaft 11. It is to be noted that although the bevelled gears 72 and 73 rotate continuously during operation of the machine, the stroke of the push rods 64, 65 is of such extent that there is lost motion at the outermost ends of their stroke, during which time the intermittent motion of the release drum described above occurs. At the moment when the aligned tube T and rod R just come to rest in the position for their interassembly, the push rods will just begin to push them together, as illustrated in FIG. 8, and the previously assembled tube and rod, indicated at T' in FIG. 8, will have just been released for dropping into the rule die cutting mechanism. At this time the rule die will be at the beginning of its downward stroke. In order to facilitate the rolling action of the tube and rod assembly T', the backing member 25 is preferably provided with a bevelled entrance face 85. FIG. 12 illustrates a finished tubular binder B after discharge from the machine and removal of its core rod.

FIG. 13 illustrates a modification of the invention wherein compressed air is utilized for actuating the push rods 37 in the rule die 20 for release of the cut-outs or blanks 24. In this modification compressed air provided by an air compressor 86 and connected by flexible tubing 87 through a valve 88 to the rule die 20 serves to force the plungers 31 forwardly for ejection of the blanks 24 when the valve 37 is mechanically actuated at the lower end of the stroke of the rule die.

While there has been described in this specification one form in which the invention may conveniently be embodied in practice, it is to be understood that this form is shown for the purpose of illustration only, and that the invention is not limited to the specific disclosure but may be modified and embodied in various other forms without departing from its spirit. In short, the invention includes all the modifications and embodiments coming within the scope of the following claims.

Referring again to FIG. 13, it will be understood that the elongated bar 37 and the plungers 31 may be eliminated and the air used to directly eject the cut-outs 24.

Having thus fully described my invention, what is claimed as new and for which it is desired to obtain Letters Patent is:

1. Apparatus for converting lengths of tubing into tubular binders and the like articles comprising, a rule die, a stationary flat backing member, mechanism for reciprocating said rule die back and forth between two end positions and in spaced parallel relation with respect to said backing member, mechanism operating in timed relation with respect to said reciprocating mechanism for feeding lengths of tubing one at a time into the space between said rule die and said backing member each time said rule die is at one of said two positions, whereby said length of tubing will be rolled over and cut by said rule die, said rule die comprising means for cutting cut-outs to be removed from said lengths of tubing, mechanism for retaining the cut-outs in said rule die after the corresponding length of tubing has been cut away from said cut-outs, and mechanism controlled by reciprocation of the die, for ejecting said cut-outs at the other end position of said rule die, said cut-out retaining mechanism comprising a tubular cylindrical member fixed in said rule die behind each of said retained cut-outs, said cylindrical member being formed into sharpened finger members extending outwardly of the face of said rule die and disposed to stick into the back surfaces of said cut-outs as they are cut from said length of tubing during movement of said rule die, said ejecting mechanism comprising a plunger coaxially disposed in each of said cylindrical members, resilient means normally holding said plunger in withdrawn position within said cylindrical member, and means simultaneously cooperative with all of said plungers for moving said plungers outwardly beyond the outer ends of said fingers to strip away the cut-outs stuck thereon, said plunger moving means comprises a longitudinal push bar disposed within a longitudinal opening within said die rule and movable from one side to another in said opening for moving said plungers, cam wheels arranged at the ends of said push bar, and lever means positioned to be contacted by said cam wheels at the other end position of said die rule.

2. The apparatus as defined in claim 1, said lever mechanism comprising a pair of pivoted levers, one for each of said cam wheels, means preventing rotation of said pivoted levers in one direction about their respective pivots, and resilient means allowing movement of said pivoted levers in the other direction about their respective pivots.

3. Apparatus for die cutting lengths of tubing, comprising a rule die, a stationary flat backing member, means for reciprocating said rule die up and down between two end positions and in spaced relation with respect to said backing member, a hopper having a central vertical partition dividing it into two side-by-side compartments for containing, respectively, precut lengths of tubing to be cut and core rods to be inserted into the tubing lengths prior to their being operated upon, means operating in timed sequence with respect to the reciprocation of said die rule for inserting one at a time of said rods into one at a time of said tubing lengths, said inserting means comprising a feed drum arranged at the lower end of said hopper, a plurality of longitudinal grooves formed in spaced relation in the peripheral surface of said drum, a Geneva drive mechanism interconnecting said crank shaft and said drum for stepwise periodic motion of said drum, said hopper comprising a lower lip portion extending arcuately from the lower end of said hopper and in spaced relation with respect to the cylindrical surface of said drum for retaining a length of tubing and a rod carried by said drum from their respective compartments in said hopper, a pair of push rods supported in axial alignment at the outer ends, respectively, of said carried length of tubing and rod and movable inwardly and outwardly in their axial direction, and mechanism interconnecting said push rods with said crank shaft for moving said push rods reciprocatingly in opposite respective directions.

4. The apparatus as defined in claim 3 wherein said push rod moving mechanism comprises a pair of rotating gears, eccentric pins on said rotating gears, and crank links interconnecting said crank pins with the outer ends of said push rods.

5. The apparatus as defined in claim 3 wherein said push rod moving mechanism comprises a pair of rotating gears, eccentric pins on said rotating gears, and crank links interconnecting said crank pins with the outer ends of said push rods, said rule die comprising means for cutting cut-outs to be removed from said lengths of tubing, mechanism for retaining the cut-outs in said rule die after the corresponding length of tubing has been cut away from said cut-outs, and mechanism controlled by reciprocation of the die, for ejecting said cut-outs at the other end position of said rule die.

6. The apparatus as defined in claim 3 wherein said push rod moving mechanism comprises a pair of rotating gears, eccentric pins on said rotating gears, and crank links interconnecting said crank pins with the outer ends of said push rods, said rule die comprising means for scoring cut-outs to be removed from said lengths of tubing, mechanism for retaining the cut-outs in said rule die after the corresponding length of tubing has been cut away from said cut-outs, and mechanism controlling said retaining mechanism for ejecting said cut-outs at the other end position of said rule die, said cut-out retaining mechanism comprising a tubular cylindrical member fixed in said rule die behind each of said retained cut-outs, said cylindrical member being formed with sharpened finger members extending outwardly of the face of said rule die and disposed to stick into the back surfaces of said cut-outs as they are cut from said length of tubing during movement of said rule die.

7. In combination, a rule die, a stationary backing member in spaced opposed relation to said die, said die having a die-cutting element projecting toward said backing element, means for reciprocating said die back and forth between two end positions and in spaced parallel relation with respect to said backing member, means controlled by said reciprocating means for inserting cores into tubes, and means controlled by said reciprocating mechanism, for feeding the tubes with the cores inserted therein one at a time into the space between said rule die and said backing member, each time said rule die has been moved back and forth and is at one of said two positions, whereby said lengths of tubing will be rolled on said backing member and cut by the cutting element of said rule die.

8. Apparatus for converting lengths of tubing into tubular binders and the like articles comprising, a rule die, a stationary flat backing member, means for reciprocating said rule die back and forth between two end positions and in spaced parallel relation with respect to said backing member, said rule die comprising means for cutting cut-outs to be removed from said lengths of tubing, means on the rule die, independent of said cutting means for retaining the cut-outs in said rule die after the corresponding length of tubing has been cut away from said cut-outs, and means controlled by said reciprocating means, for ejecting said cut-outs at the other end position of said rule die, said cut-out retaining means comprising a tubular cylindrical member fixed in said rule die behind each of said retained cut-outs, said cylindrical member being formed into sharpened finger members extending outwardly of the face of said rule die and disposed to stick into the back surfaces of said cut-outs as they are cut from said length of tubing during movement of said rule die.

9. The combination of claim 8, said ejecting means comprising a plunger coaxially disposed in each of said cylindrical members, resilient means normally holding said plunger in withdrawn position within said cylindrical member, and means controlled by said reciprocating means and simultaneously cooperative with all of said plungers, for moving said plungers outwardly beyond the outer ends of said fingers to strip away the cut-outs stuck thereon.

10. The combination of claim 9, wherein said plunger moving means comprises a longitudinal push bar disposed within a longitudinal opening within said die rule and movable from one side to another in said opening for moving said plungers, cam wheels arranged at the ends of said push bar, and lever means positioned to be contacted by said cam wheels at the other end position of said die rule.

11. The combination of claim 10, said lever mechanism comprising a pair of pivoted levers, one for each of said cam wheels, means preventing rotation of said pivoted levers in one direction about their respective pivots, and resilient means allowing movement of said pivoted levers in the other direction about their respective pivots.

12. In combination a rule die member, a backing member in spaced parallel relation thereto, means to cause longitudinal movement of one member relative to the other member whereby a length of tubing fed between said members may be rolled and cut by the die member, said rule die member comprising means for cutting cut-outs to be removed from said tubing, means on the rule die member for retaining the cut-outs in said rule die member after said tubing has been cut by said rule die member and said tubing has been fully rolled against said rule die member, and mechanism controlled by said means which causes relative movement of said members, for ejecting said cut-outs after said tubing has been fully rolled against said rule die member, said cut-out retaining mechanism comprising a member fixed in said rule die behind each of said retained cut-outs and being formed with sharpened fingers extending outwardly of the face of said rule die and dsposed to stick into the back surfaces of said cut-outs as they are cut from said length of tubing during movement of said rule die, and said ejecting means comprising a plunger slidably disposed on each of said fixed members, in withdrawn position, and means simultaneously cooperative with all of said plungers for moving said plungers outwardly beyond the outer ends of said fingers to strip away the cut-outs stuck thereon.

13. The combination of claim 12, said plunger moving means comprises a longitudinal push bar disposed within a longitudinal opening within said die rule and movable from one side to another in said opening for moving said plungers, cam wheels arranged at the ends of said push bar, and lever means positioned to be contacted by said cam wheels at the other end position of said die rule.

14. The combination of claim 13, said lever mechanism comprising a pair of pivoted levers, one for each of said cam wheels, means preventing rotation of said pivoted levers in one direction about their respective pivots, and resilient means allowing movement of said pivoted levers in the other direction about their respective pivots.

15. Apparatus for die cutting lengths of tubing, comprising a vertical rule die, a stationary flat backing member having a vertical surface, means to slidably mount said die for up and down movement parallel to said surface, said rule die having a die cutting element projecting toward said surface, means for reciprocating said rule die up and down in its vertical plane, to raise said die above said surface and to lower said die to a position opposed to said surface, a hopper for lengths of tubing, and means controlled by said reciprocating mechanism for feeding lengths of tubing from said hopper one at a time between said rule die and surface in such sequence that the down movement of the rule die will cause the tubing to be rolled by the die against said surface, to die cut said tubing, said tubing feeding mechanism comprising a feed drum arranged at the lower end of the hopper, and formed with a plurality of equiangularly spaced longitudinal peripheral grooves, each adopted to receive tubing from the hopper, and means, controlled by said reciprocating means, for intermittent angular rotation of said drum corresponding to the angle between said grooves, in combination with means, controlled by said reciprocating means, to insert cores into the tubing received in said grooves.

References Cited in the file of this patent

UNITED STATES PATENTS

| | | |
|---|---|---|
| 183,780 | Shaver et al. | Oct. 31, 1876 |
| 230,294 | Lincoln | July 20, 1880 |
| 574,902 | Heckel | Jan. 12, 1897 |
| 923,552 | Mill | June 1, 1909 |
| 1,430,373 | Hennings | Sept. 26, 1922 |
| 1,695,460 | Iwanicki | Dec. 18, 1928 |
| 2,095,631 | Cumfer | Oct. 12, 1937 |
| 2,226,002 | Langhammer | Dec. 24, 1940 |
| 2,275,525 | Halmrast | Mar. 10, 1942 |
| 2,298,374 | Hartman | Oct. 13, 1942 |
| 2,361,783 | McLaughlin | Oct. 31, 1944 |
| 2,424,678 | Collinson | July 29, 1947 |
| 2,487,271 | Petri | Nov. 8, 1949 |
| 2,546,060 | Hart | Mar. 20, 1951 |
| 2,556,965 | Gomez | June 12, 1951 |
| 2,620,873 | Eaton | Dec. 9, 1952 |
| 2,672,630 | Bitzer et al. | Mar. 23, 1954 |
| 2,674,755 | Schzicksupp | Apr. 13, 1954 |
| 2,679,291 | Collinson | May 25, 1954 |
| 2,698,478 | Heisterkamp et al. | Jan. 4, 1955 |
| 2,724,200 | Larmour | Nov. 22, 1955 |
| 2,757,778 | Lyons | Aug. 7, 1956 |

FOREIGN PATENTS

| | | |
|---|---|---|
| 669,752 | Great Britain | Apr. 9, 1952 |
| 676,340 | Great Britain | July 23, 1952 |